Patented Oct. 31, 1950

2,528,188

UNITED STATES PATENT OFFICE 2,528,188

TWO TOWER PROCESS FOR RECOVERY OF STREPTOMYCIN EMPLOYING CATION-EXCHANGE RESINS

Roy J. Taylor, Kew Gardens Hills, N. Y., assignor to Chas. Pfizer & Co., Inc., New York, N. Y., a corporation of New Jersey No Drawing. Application April 12, 1949,
Serial No. 87,105

2 Claims. (Cl. 260—210)

This invention relates to the production of therapeutically valuable antibiotic agents, and more particularly, to an economical and efficient method for separating and recovering streptomycin from fermentation broth.

It is known that streptomycin is obtained as an elaboration product of the mold *Actinomyces griseus*. The streptomycin as obtained in the harvested fermentation broth is in very dilute aqueous solution and is further associated with certain undesirable impurities which must be separated therefrom in order to obtain therapeutically useful products of high antibiotic potency. It has been proposed to use certain cation-exchange resins for the separation of streptomycin from aqueous solutions thereof, but the economical recovery of streptomycin from the very dilute fermentation broth solutions offers many difficulties.

It is an object of this invention to provide an economical and efficient method for the separation of streptomycin from harvested fermentation broth. A further object is to provide a method by which cation-exchange resins can be economically and efficiently employed in the separation and recovery of streptomycin from fermentation broth. A still further object is to provide a continuous method for treating streptomycin-containing broth which affords a particularly complete separation of the streptomycin from the broth. Further objects will appear hereinafter.

It has been found that in absorbing streptomycin on a carboxylated cation-exchange resin, maximum adsorption occurs at an equilibrium pH between 7 and 8. It has further been found that the maximum adsorption is more rapidly attained when the broth has an initial pH of 7 to 8, and the resin has been partially converted to a salt form with easily replaceable cations such as sodium, potassium, or ammonium ions. The proportion of free acid carboxyl groups in the partial salt form of the resin is preferably such as to give an equilibrium pH of 7 to 8 when a sample of the resin is stirred with distilled water.

It has further been found that streptomycin can be practically completely separated from a clarified harvested fermentation broth by adjusting the pH of the broth to between 7 and 8, and then passing this broth through two adsorption towers in series, the first of which initially contains a carboxylated cation-exchange resin partially converted to a salt form with easily replaceable cations, suitably sodium, potassium, or ammonium ions, and the second of which contains a carboxylated cation-exchange resin in the form of the free acid. The passage of the broth through the two towers is preferably continued until the resin in the first tower has adsorbed sufficient streptomycin to equal 50-100% of the saturation value, this value being the amount of streptomycin adsorbed when the concentrations of streptomycin in entering and effluent broth are equal. During this period, some streptomycin leakage from the first tower occurs, the amount of leakage generally being from 2 to 15% of the amount fed, depending on the flow rate of the broth. A substantial proportion of this unadsorbed streptomycin is adsorbed in the second tower, and simultaneously the resin in the second tower is partially converted to a salt form having substantially the same amount of easily replaceable cations as was initially present in the resin in the first tower. This conversion is effected by replacement of carboxylic hydrogen atoms with cations either originally present in the broth entering the first tower or displaced from the resin in the first tower by streptomycin.

At the end of the adsorption cycle, the first tower is taken off stream and the streptomycin eluted from the resin with a dilute acid solution, preferably with dilute aqueous hydrochloric acid. The elution process also regenerates the cation-exchange resin in the first tower to the free acid, and this tower can then be returned to the process as the secondary tower in the series.

It has further been found that this invention can be very advantageously employed in a continuous process utilizing three adsorption towers, each containing the same amount of carboxylated cation-exchange resin. A crude streptomycin-containing fermentation broth from which the mycelium has been removed is adjusted to pH 7 to 8 and is introduced into an adsorption tower containing a bed of carboxylated cation-exchange resin which has been partially converted to an easily replaceable salt form. The effluent from this first tower which has passed through the resin bed is conducted into a second adsorption tower connected in series with the first and which contains a like amount of carboxylated cation-exchange resin initially in the form of the free acid. The flow of the streptomycin-containing broth through the resin beds in the two towers is continued until the resin in the first tower is 50 to 100% saturated with respect to streptomycin. At this point, the carboxylated resin in the second tower has been converted to the desired partial salt form. The first tower is now taken off stream for elution, while the second original tower becomes tower number one in the new series, and is in turn connected in series with a third tower which contains a like amount of carboxylated cation-exchange resin as a free acid, to complete the required combination.

The streptomycin is recovered from the off-stream tower by elution of the resin with dilute acid. In addition to removing the streptomycin, the dilute hydrochloric acid also functions to regenerate the resin to the free acid form. When the resin in tower number one of the new combination is 50–100% saturated with respect to streptomycin and is ready to be taken off-stream, the tower containing the regenerated resin can then be added on-stream again as the second tower in the essential combination. Thus, employing three towers, two on-stream, and one being eluted and regenerated, there is provided an economical and effective process for treating continuously a streptomycin-containing solution and recovering almost completely the streptomycin therefrom.

Typical carboxylated cation-exchange materials useful in the application of this invention include the following:

1. The partial esters produced by the reaction of polybasic carboxylic acids or acid anhydrides with polysaccharides or other polymeric substances containing esterifiable hydroxyl groups. Detailed procedures have been described by McIntire and Schenck (J. Am. Chem. Soc. 70, 1193 (1948)).

2. Synthetic cation-exchange resins containing carboxylic acid groups, for example:

(a) Phenol-formaldehyde resins containing co-condensed amino-carboxylic acids or semi-amides of polycarboxylic acids, prepared by the methods described in the examples and descriptive portions of U. S. Patents 2,373,547 and 2,373,548.

(b) Resins prepared by condensation of an aldehyde with a carboxylated monor- or polyhydric phenol, such as Wofatit C, which is produced in Germany by the reaction of formaldehde with 3,5-dihydroxybenzoic acid as described in Fiat Final Report No. 715, February 4, 1946.

(c) Resins prepared by treatment of a phenol-aldehyde resin gel with carbon dioxide or substances that liberate carbon dioxide (bicarbonates) as described in Belgian Patent 447,662, November 30, 1942.

(d) Insoluble copolymers produced from polymerizable mixtures containing maleic anhydride, such as those described in U. S. Patent 2,340,110.

(e) Insoluble copolymers produced from polymerizable mixtures containing acrylic or methacrylic acid, such as those prepared by the methods described in U. S. Patent 2,340,111.

In the practice of this invention, it is particularly convenient to employ a carboxylic cation-exchange resin now manufactured in commercial quantities under the trade-name Amberlite IRC-50, a product of the Resinous Products Division of Rohm and Haas Chemical Company.

The pH of the solution from which the streptomycin is to be separated is preferably adjusted to the range of about 7.0 to 8.0 before contacting with the carboxylated cation-exchange material, since it has been found that this is the optimum pH range for adsorption by this cation-exchange material.

The process of this invention is more specifically illustrated by the following example:

Example

Two adsorption towers, designated A and B respectively, each four inches in diameter, were charged to a depth of 5½ feet with carboxylated cation-exchange resin in the free acid form. The resin in tower A was then partially converted to its sodium salt by rapidly pumping a 2% sodium hydroxide solution through the tower at a rate sufficient to maintain a high alkalinity in the effluent. The effluent was recycled continuously through the tower until the pH dropped below 8. The treatment with sodium hydroxide is necessary only when starting up with new resin in each tower.

Clarified streptomycin-containing fermentation broth was then pumped at a rate of 1.0 to 1.5 gallons per minute through the two towers, in series, with tower A first and tower B, containing the acid resin, second in the series. The flow of broth was continued until approximately 500 gallons had been passed through the two towers. During this period, it was found that the streptomycin content of the broth leaving tower A gradually rose to approximately 30% of the feed concentration and averaged 11%. The pH of the effluent from tower B gradually rose from about 4 to about 7 near the end of the run, indicating conversion of the acid resin to the partial salt form. The total streptomycin in the effluent from tower B was 2.0% of the amount fed to the first tower.

Tower A was then drained and washed with water. The streptomycin as eluted from the resin in this tower by passing dilute aqueous hydrochloric acid containing 1.3% HCl by weight through the resin bed until the acidity of the effluent equalled that of the influent. The eluate was neutralized and further treated to recover the streptomycin in a form for therapeutic administration.

After washing out the excess acid with water, tower A was used as the second tower in another run, while tower B, without further treatment, became the first tower. A total of five successive runs were made in this manner with each tower alternately serving as primary and secondary adsorption towers. In each run approximately 500 gallons of clarified streptomycin-containing fermentation broth was passed through the two towers. The amount of streptomycin leaving each tower is tabulated below, expressed as percentage of the feed.

| Run | First Tower | Per Cent Leaving First Tower | Per Cent Leaving Second Tower |
|---|---|---|---|
| 1 | A | 11 | 2.0 |
| 2 | B | 24 | 2.3 |
| 3 | A | 7 | 2.2 |
| 4 | B | 11 | 2.0 |
| 5 | A | 9 | 1.5 |

For maximum adsorption of streptomycin on the carboxylated cation-exchange resin, it is essential that the resin be partially converted to the sodium salt. The combination of the two towers in series is very advantageous since the effluent from the first column carries with it the displaced sodium ions which react with the carboxyls of the cation-exchange resin in the second tower and automatically condition this column for maximum streptomycin adsorption without further treatment when it is placed on stream as a primary column in a continuous process.

As many apparently widely different embodiments of this invention may be made without departing from the spirit and scope hereof, it is to be understood that the invention is not limited to the specific embodiments hereof, except as defined in the appended claims.

I claim:

1. A process for separating streptomycin from harvested fermentation broth which comprises passing said broth at a pH of substantially between 7 and 8 through two adsorption towers in series, the first of which initially contains a cation-exchange resin partially converted to the sodium salt wherein the functional groups are carboxyl groups, and the second of which initially contains a cation-exchange resin of the same type in the form of its free acid, and continuing the passage of said broth until the resin in the first tower is 50–100% saturated with respect to streptomycin.

2. A process for recovering streptomycin from fermentation broth which comprises passing said broth at a pH of substantially between 7 and 8 through two adsorption towers in series, the first of which initially contains a cation-exchange resin partially converted to a salt form with easily replaceable cations and wherein the functional groups are carboxyl groups, and the second of which initially contains a similar resin in the form of its free acid, until the resin in the first tower is substantially saturated with streptomycin.

ROY J. TAYLOR.

REFERENCES CITED

The following references are of record in the file of this patent:

UNITED STATES PATENTS

| Number | Name | Date |
|---|---|---|
| 2,443,485 | Waksman et al. | June 15, 1948 |

OTHER REFERENCES

Kocholaty et al., Arch. Biochem. 1947, pp. 55–64, 10 pages.